United States Patent [19]
Bruce

[11] Patent Number: 5,392,803
[45] Date of Patent: Feb. 28, 1995

[54] APPARATUS AND METHOD FOR INSTALLING VALVES

[75] Inventor: Douglas A. Bruce, Fresno, Calif.

[73] Assignee: CMB Industries, Inc., Fresno, Calif.

[21] Appl. No.: 978,575

[22] Filed: Nov. 19, 1992

[51] Int. Cl.$^6$ .................. F16K 43/00; F16L 43/02
[52] U.S. Cl. .................... 137/15; 137/315; 285/30; 285/179
[58] Field of Search ............ 137/15, 315, 364; 285/30, 179

[56] References Cited

U.S. PATENT DOCUMENTS

| | | | |
|---|---|---|---|
| 866,952 | 9/1907 | McKee | 285/30 |
| 909,179 | 1/1909 | Gray et al. | 285/30 |
| 1,142,667 | 6/1915 | Calhoun | 285/30 |
| 1,267,651 | 5/1918 | Ford | 285/30 |
| 1,290,665 | 1/1919 | Russell | 285/30 |
| 1,298,596 | 3/1919 | Stevens | 285/30 |
| 1,346,440 | 7/1920 | Bradfield | 285/30 |
| 1,835,924 | 12/1931 | Bartholomay | 285/30 |
| 2,438,497 | 3/1948 | Ford | 285/30 |
| 2,576,630 | 11/1951 | Mueller et al. | 285/30 |
| 2,650,837 | 9/1953 | Smith et al. | 285/30 |
| 2,795,437 | 6/1957 | Mueller | 285/30 |
| 2,892,641 | 6/1959 | Ford | 285/179 |
| 3,511,524 | 5/1970 | Ford et al. | 285/30 |
| 3,730,213 | 5/1973 | Bates | 285/30 |
| 3,961,528 | 6/1976 | Ford | 137/364 |

OTHER PUBLICATIONS

NAPPCO, 3"-24" Full-Flow Ductile Iron Mechanical Joint Fittings, pp. 2 and 10.
Riken, Couplings and Fittings, Assembly Procedure for Couplings, pp. 5 and 7.
Valley Pipe & Supply, Inc., Cast Iron Flanged, p. pf.–47.
Mueller 2-$\frac{1}{8}$" Post and Flush Type Fire Hydrants.
Water and Water Supplies for Fire Protection, pp. 16-38 and 16-39.
Ames Co. Engineered Products, Specification Sheet Backflow Piping Products Risers, Manifolds, Custom Retrofits 2$\frac{1}{2}$-10" FLG, MJ, PE, Bell.
Mueller, Cast Iron Meter Yokes and Cast Iron Meter Boxes.

Primary Examiner—George L. Walton
Attorney, Agent, or Firm—Townsend & Townsend Khourie & Crew

[57] ABSTRACT

Alignment and spacing apparatus for use in installing valves such as backflow preventer valves is provided. First and second couplers such as 90 degree elbow joints are each provided with alignment arms extending therefrom. The alignment arms have portions which permit the arms to be coupled to one another. The alignment arms provide for configuring the elbows in a predetermined relationship with one another, such as for providing for seating the alignment arms with respect to each other in a predetermined relationship. In one embodiment, each alignment arm has a flange portion which is seated against a shoulder portion of the other alignment arm in such a way that the elbow joints are connected such that the center line of the inlet and outlet of the elbow joints are substantially parallel and spaced apart a predetermined distance.

24 Claims, 6 Drawing Sheets

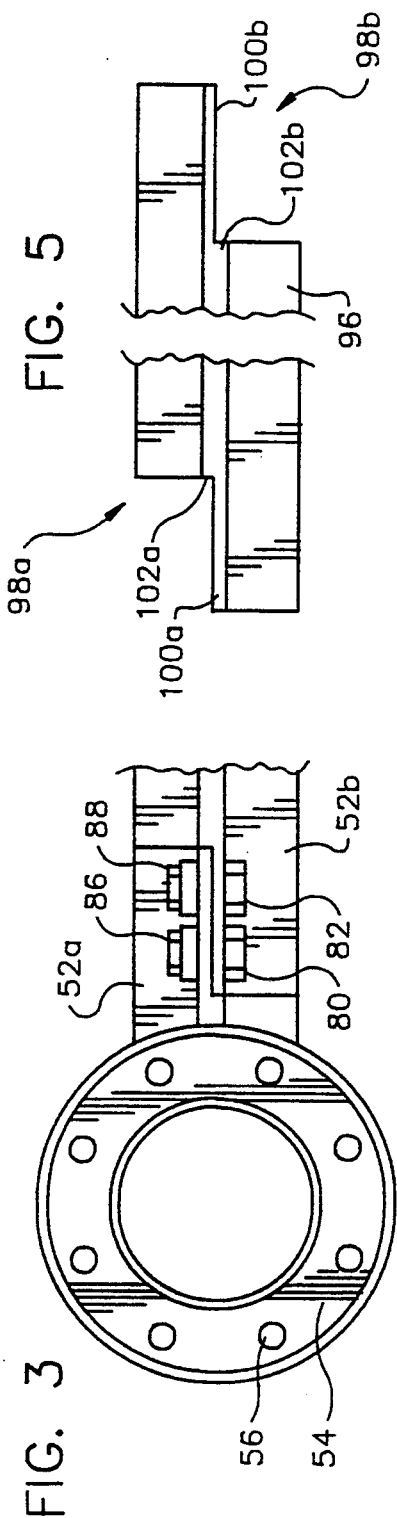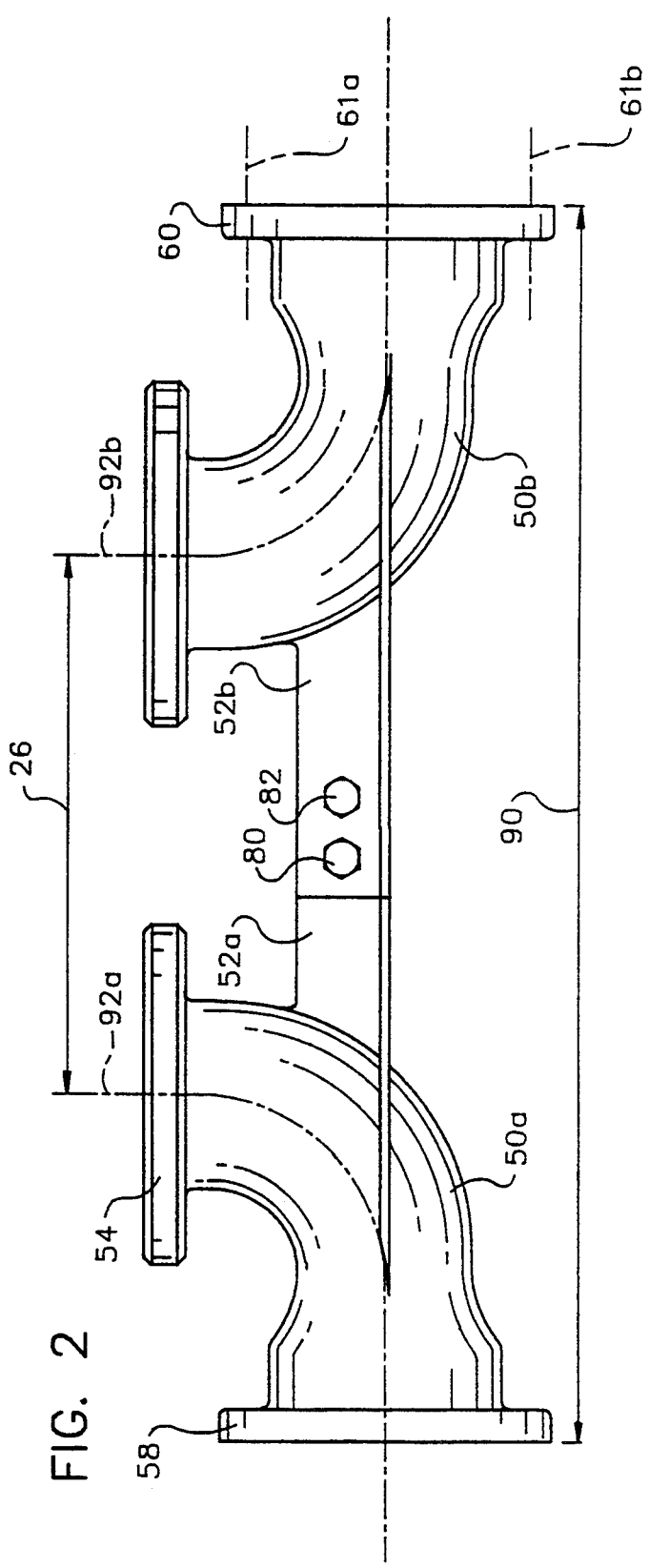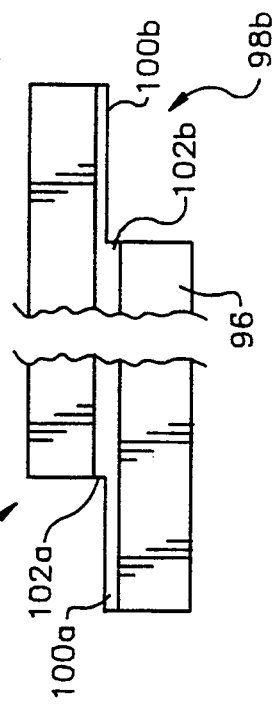

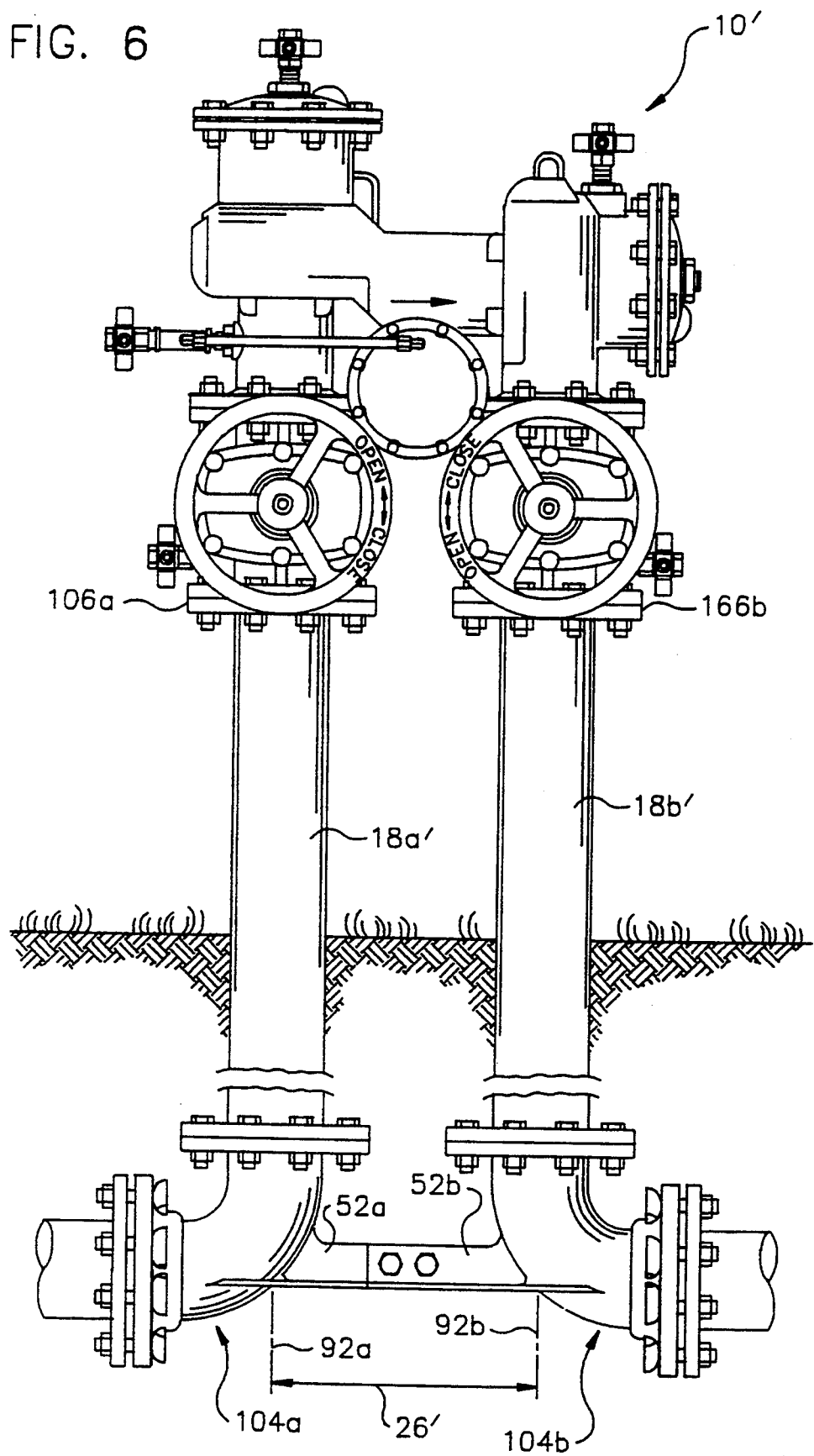

APPARATUS AND METHOD FOR INSTALLING VALVES

BACKGROUND OF THE INVENTION

The present invention relates to an apparatus and method for installing valves and, in particular, to apparatus for connecting and aligning pipe joints used for valve installation.

Installation of valves in fluid lines such as installation of backflow preventer valves in water lines, present problems of positioning components, such as alignment and spacing of pipe joints, which up to now have required significant investment of labor and materials. As seen in FIG. 1, when it is desired to connect, for example, a backflow preventer valve apparatus 10 between an inlet conduit 12 and an outlet conduit 14, a number of pipe joints, such as elbow joints 16a14 16b, pipe components 18a–18b, and second elbow joints 20a–20b may be used. The backflow valve apparatus 10 is configured such that the faces of the inlet and outlet thereto 22a–22b must be substantially parallel and must be spaced apart precisely a first distance 24. In order to achieve this type of installation, the pipe component 16a–16b, 18a–18b, 20a–20b must be configured such that the centerlines of pipe components 18a–18b are a pre-defined distance apart 26 and are substantially parallel to each other. As can be seen from FIG. 1, the relative configuration of pipe components 18a–18b is determined principally by the configuration of elbow joints 16a–16b. Accordingly, in providing for installation of the backflow valve 10, the precise alignment and spacing of elbow joints 16a–16b is important. Also, as shown in FIG. 1, experience indicates, and many building codes require, that the elbow joints 16a–16b must be embedded in concrete pads 28a–28b to absorb forces, particularly forces from high transient water pressure which tends to impact the elbow joint 16a–16b at the outside corner radius 30a–30b thereof. The pressure exerted on the elbow joint 16a–16b is of such a nature that, in the configuration of FIG. 1, the force is in a direction tending to place flange bolts 32a–32b, 34a–34b under sheer or tension stress.

Typically, when installation of a valve such as a backflow preventer valve 10 is desired, the dimension and configuration of the valve 10, e.g. dimension 24, is provided to an installer who travels to the installation site, excavates as necessary, calculates or determines what should be the spacing 26, installs elbow joint 16a–16b with the intention of aligning the elbow joint 16a–16b such that, following installation of components 18a–18b, 20a–20b, the valve 10 will fit precisely between elbow joints 20a–20b. The pads 28a–28b are poured and the excavation is filled in. Thereafter, the backflow preventer valve 10 is installed by connecting 2 elbow joints 20a–20b, and often requiring temporary or permanent installation of jacks 36a–36b to bear the weight of the valve 10.

In one typical installation, the distance 26 is about 63 inches (about 1.6 meters). In measuring across distances of this amount, it is often difficult to position the elbow joint 16a–16b with the precision desired for installation of the valve 10. Mis-positioning or mis-alignment of the elbows 16a–16b, is often discovered only when an attempt is made to install valve 10. It then becomes necessary to cut and install additional spacer pipe and/or to excavate, remove the pads 28a–28b and reposition elbow joints 16a–16b, pipe components 18a–18b, and elbows 20a–20b in an attempt to provide a more accurate positioning. Further, there is a tendency, during installation, for the elbow 16a–16b to roll clockwise or counterclockwise such that the upper flanges 16a–16b are moved out of the co-planer configuration. This procedure of attempting to position the elbow 16a–16b based on measurements is a labor-intensive and costly procedure, particularly when, as is not uncommon, errors are made requiring additional adjustments or reinstallation of elbows.

Accordingly, it would be advantageous to provide an apparatus and method for installing valves which permit a precise alignment and positioning of components.

SUMMARY OF THE INVENTION

The present invention provides for positioning and alignment of components by providing components, such as elbow joints, with positioning and alignment devices attached thereto. In one embodiment, elbow joints are provided with alignment arms for holding two elbow joints in a predefined relationship, spaced apart a predefined distance. In one embodiment, two elbow joints, each with substantially identical alignment arms, have the alignment arms configured so that they may be mated together to position the elbow joints as desired, such as by providing a mating configuration which includes a flange portion and a shoulder portion. Preferably, the alignment arms may be joined either directly one to another or by use of a spacer bar so as to permit different spacings for installing different sizes of valves. Preferably, the alignment arms are positioned substantially at the turn location of an elbow joint to provide for transmission of force, such as transient forces, preferably so as to load the alignment arms in a compression fashion rather than a tension fashion. In one embodiment, such compression loading means that the pads 28a, 28b can be dispensed with. In one embodiment, the elbow joints and/or alignment arms are provided with feet to assist in positioning the joints, such as by resting the feet on the bottom of an excavation trench.

BRIEF DESCRIPTION OF THE DRAWINGS

FIG. 2 is an elevational view of two elbow joints attached using alignment arms;

FIG. 3 is a top plan view of a portion of the apparatus of FIG. 2;

FIG. 5 is a top plan view of an extension arm according to an embodiment of the present invention;

FIG. 6 depicts a backflow prevention valve installed using positioning/alignment apparatus according to the present invention;

DETAILED DESCRIPTION OF THE PREFERRED EMBODIMENTS

Figure 1:
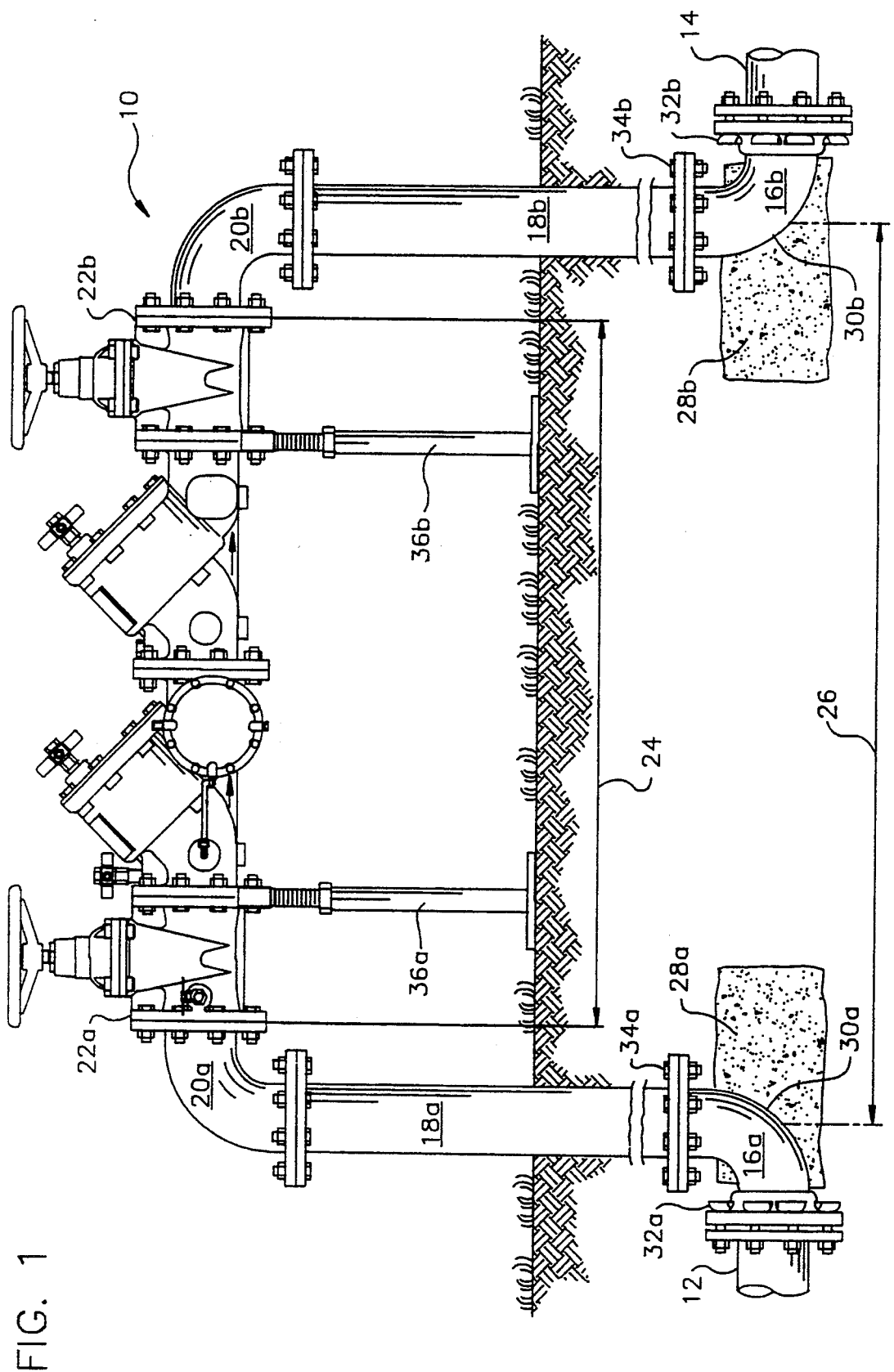
FIG. 1 is a partially subterranean plan view of an installed backflow prevent valves.

As depicted in FIG. 2, first and second elbow joints 50a–50b are each provided with alignment arms 52a–52b. Preferably each arm is permanently joined to an elbow joint such as by being integrally formed therewith, or attachment such as by welding and the like. The elbow joints 50a-50b may be any of a number of types of elbow joints. In the elbow joint depicted in FIGS. 2 and 3, attachment at the top is by way of a flange 54 having holes 56 to permit connection to other components by way of bolts. Other types of connection are also possible. In one embodiment, the interconnect 54 is configured so that it is suitable to connect with the backflow device (or to connect with pipes which will lead to the backflow device), while the in-line connections 58, 60 are configured such that they are suitable for connection to an inlet pipe and an outlet pipe respectively. In one embodiment, the inlet 58 and outlet 60 will be provided with a mechanical joint, i.e., a joint in which a pipe is connected to the fitting using a flange. When other pipe schedules are used, e.g. asbestos, cement or PVC, transition joint rings may be substituted by the installer. In addition to the flanged upper end 54, the elbow joints may be configured to accommodate a backflow device with grooved ends. Configuring connectors with flanges, grooved ends or other connection configurations is well known in the art.

Figure 4:
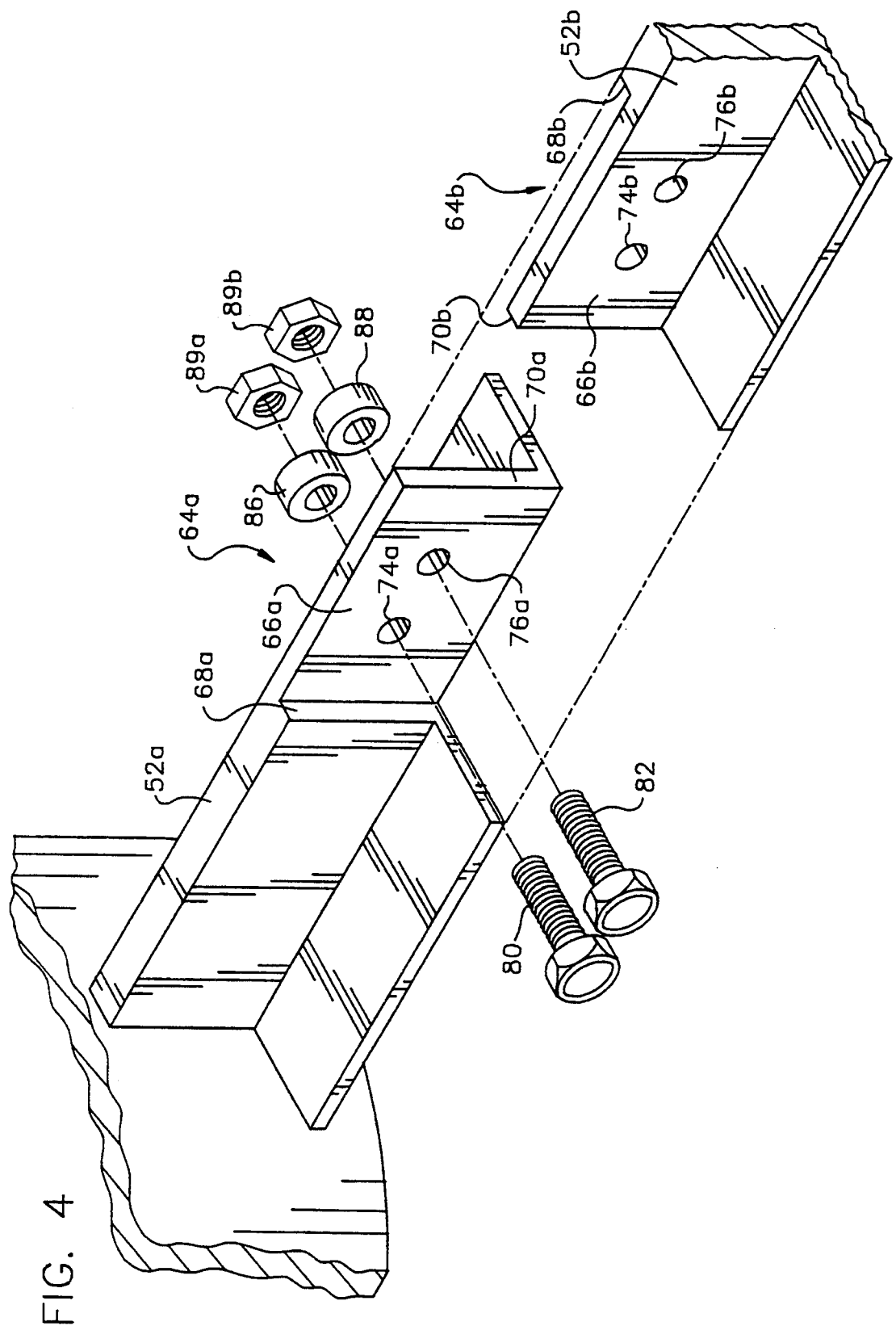
FIG. 4 is a perspective view of an alignment arm according to an embodiment of the present invention.

As depicted in FIG. 4, the alignment arm 52a has the general cross-sectional shape of two back-to-back L-shaped arms. The ends 64a-64b of the arms 52a-52b have complementary shapes such that the ends 64a-64b can be connected with each other so as to permit reliable positioning of the arms 52a-52b in substantially parallel alignment, spacing the elbows 50a-50b a predefined distance apart. Preferably, the arms 52a-52b are substantially identical to one another so that the left and right elbows 50a-50b and attached alignment arms 52a-52b are identical and can be substituted one for the other. In this way, it is not necessary to maintain separate inventories of left elbows and right elbows. In the embodiment depicted in FIG. 4 the complementarily shaped ends 64a-64b include a flange portion 66a-66b and a shoulder portion 68a-68b. As shown in FIG. 3, when the alignment arms 52a-52b are positioned adjacent one another, the end surface of the first flange 66a is adjacent and substantially touching the shoulder surface 68b of the second alignment arm 52b. Similarly, the end surface 70b of the flange 66b of the second arm 52b will be adjacent and substantially in contact with the shoulder portion 68a of the first arm 52a.

The arms 52a-52b are configured so as to permit secure attachment of the arms 52a-52b to one another. In the embodiment depicted in FIG. 4, the arms 52a-52b are provided with holes 74a-74b, 76a-76b which will be substantially in alignment when the arms 52a-52b are positioned as described above. Pairs of aligned holes 74a-74b and 76a-76b accommodate, respectively, coupling devices such as bolts 80-82. In one preferred embodiment, bosses 86, 88 are attached to one or both of the arms 52a-52b in alignment with the holes 74a-74b, 76a-76b to receive portions of the bolts 80-82. In one embodiment, the bosses 86-88 are integrally formed with one or both of the alignment arms 52a-52b such as by being cast at the same time. The bosses 86, 88 permit the arms 52a-52b to be attached using bolts 80-82 which are longer than would otherwise be the case. By permitting the use of longer bolts 80, 82, the bosses 86, 88 permit the installer to use bolts 80-82 which are the same size commonly used for bolting together flanges, thus eliminating the need for providing specially-sized bolts to the installer.

Figure 8:
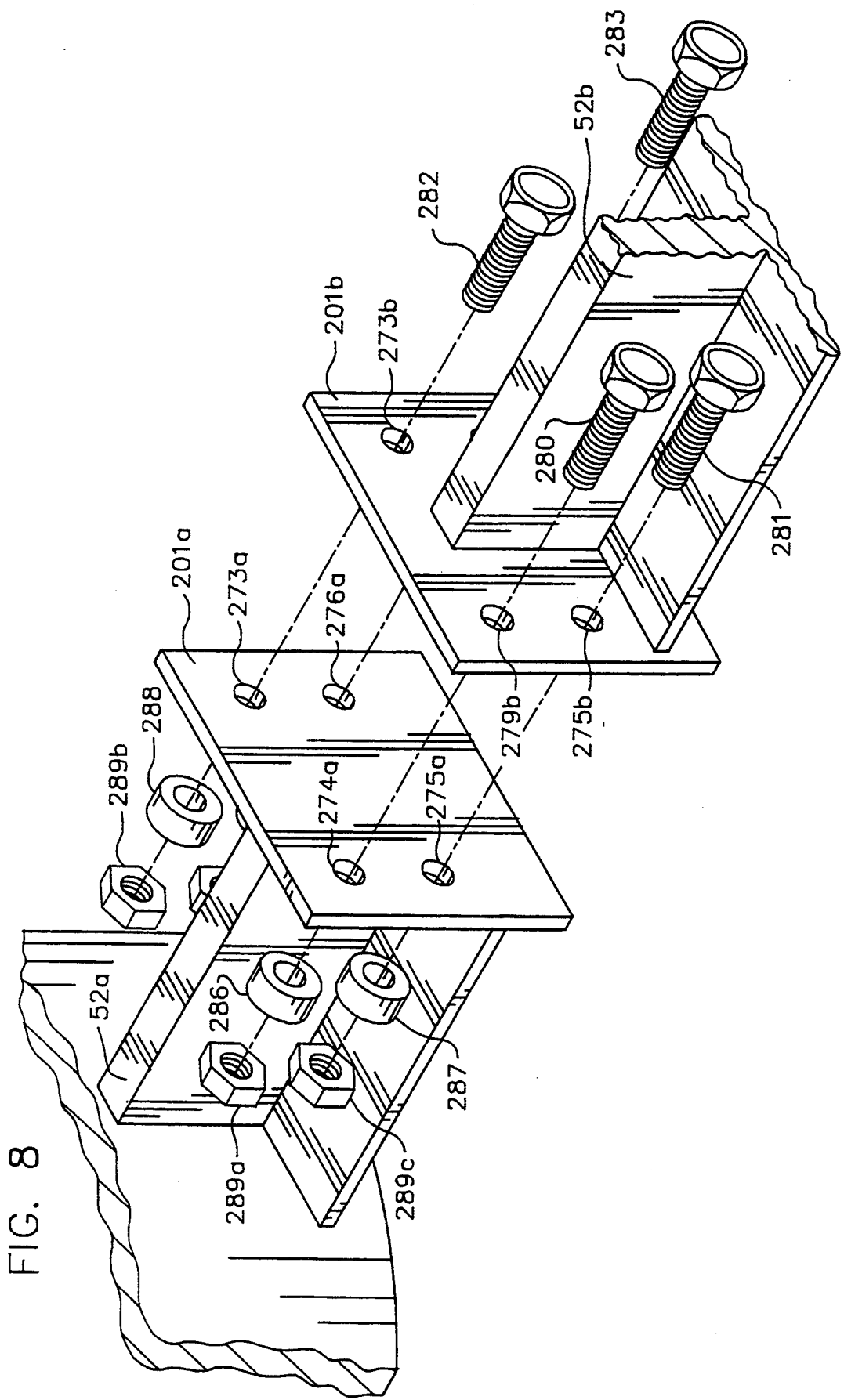
FIG. 8 is a perspective view on an alignment arm according to an embodiment of the present invention.

According to another embodiment of the invention, depicted in FIG. 8, the arms 52a, 52b are provided with end plates 201a, 201b used for attaching the arms to each other. The end plates 201a, 201b include holes 273a-276a, 273b-276b for accommodating bolts 280, 281, 282, 283. The bolts are fastened with nuts 289a, 289b, 289c, optionally using bosses 286, 287, 288. The plates 201a, 201b are attached to the arms 52a, 52b, e.g., by welding. In the embodiment depicted in FIG. 1, the arm attachment holes 273a-276a, 273b-276b can be drilled along axes parallel to the axes 61a, 61b (FIG. 2) of drilling for at least one elbow flange 60.

As shown in FIG. 2, when the alignment arms 52a-52b are aligned as described and bolted together, the alignment arms 52a-52b position the elbows 50a-50b a predetermined distance apart 90. This assures that the centerlines of the upper outlets 26 will be a predetermined distance apart. Moreover, because the arms 52a-52b define a predetermined angular relationship between the elbows 50a-50b, the alignment arms 52a-52b, when positioned as described and coupled together provide for the desired angular relationship of the centerlines 92a-92b of the outlets, such as a parallel relationship.

FIG. 5 depicts an extension arm 96 which can be used in conjunction with the alignment arms 52a-52b to provide for elbows 50a-50b which are in the desired angular relationship, as described above, but also spaced apart a distance greater than the distance 90 determined by the alignment arms 52a-52b alone. The extension arm 96 includes first and second ends 98a-98b which are substantially congruent with the ends 64b-64a of the second and first alignment arms 52b-52a respectively. In particular, each end includes a flange portion 100a-100b and a shoulder portion 102a-102b. In use, the extension arm 96 is attached such that the first end 98a is coupled to the end 64a of the first arm 52a and the second end 98b is coupled to the end 64b of the second alignment arm 52b. Appropriate holes for accommodating bolts and the like are provided in the extension arm 96.

FIG. 6 depicts alignment devices 104a-104b used for installation of a backflow preventer valve 10'. In one embodiment, the backflow preventer valve 10' depicted in FIG. 6 is of a type described in co-pending application number 07/650,799 incorporated herein by reference, now U.S. Pat. No. 5,107,888. Installation of the preventer depicted in FIG. 6 is, in some ways, even more difficult than that depicted in FIG. 1 since it is difficult or impossible to adjust for errors in the center line distance 26' by adding additional pipe segments. In the embodiment depicted in FIG. 6, alignment arms 52a-52b are attached in such a way that the outlet centerlines 92a-92b are substantially parallel and spaced apart a predetermined distance 26' so as to accommodate connection to the inlet 106a and outlet 106b of the backflow preventer valve 10'.

Figure 7:
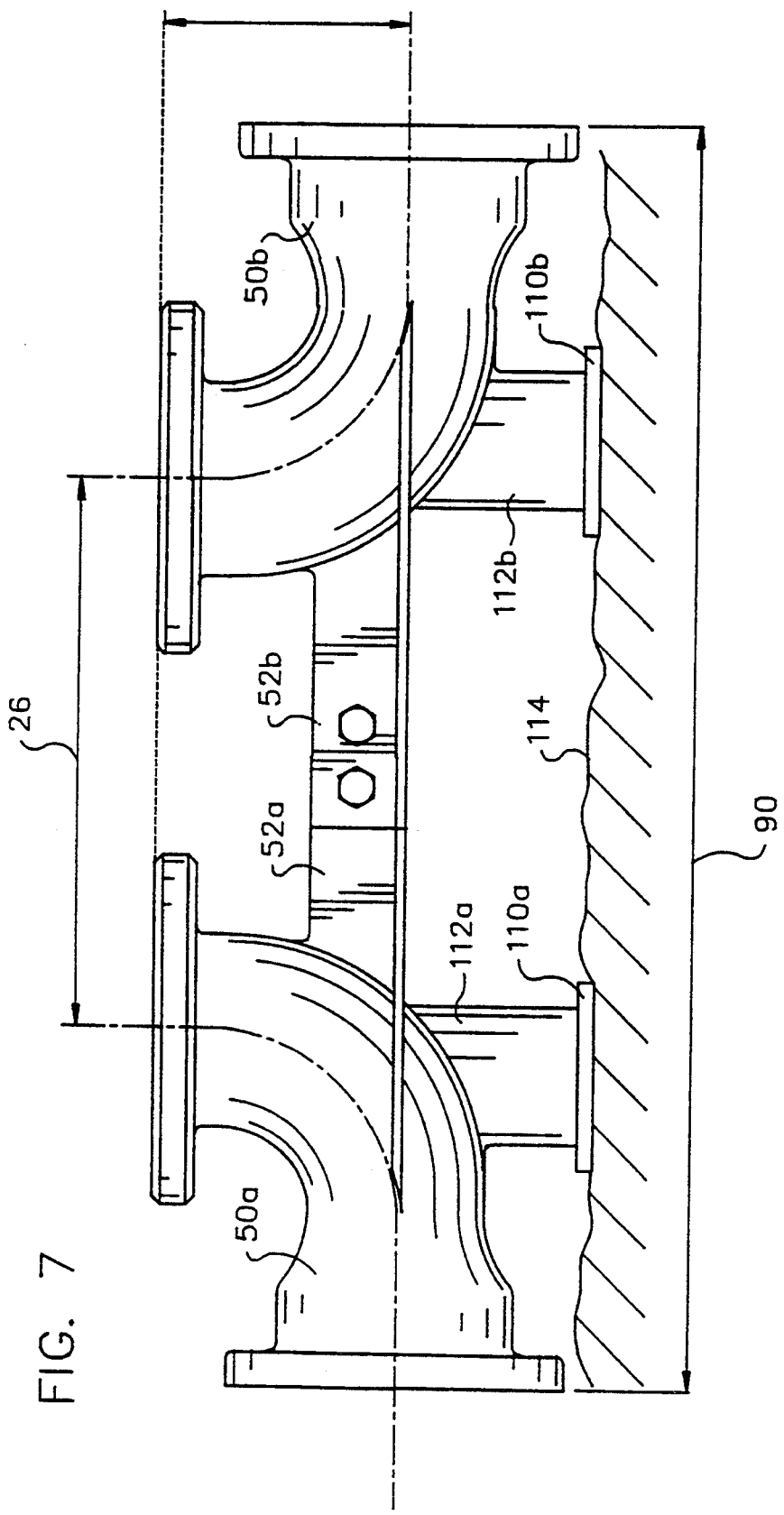
FIG. 7 is an elevational view of two elbow joints having positioning feet, according to one embodiment of the present invention.

According to another embodiment, as depicted in FIG. 7, the elbows 50a-50b include feet 110a14 110b attached to the elbows 50a-50b, e.g. by webs 112a-112b. The feet 110a-110b are substantially coplanar for supporting the elbows 50a and 50b against the bottom of a trench 114 during installation. Providing both alignment arms 52a-52b and feet 110a and 110b further assist in providing the desired alignment and positioning of pipe segments for the installation of valves.

In use, the installer will excavate to expose the pipe 12, 14 to which the backflow preventer is to be attached. The elbows 16a–16b are attached to the pipes 12, 14 and also attached to each other via the alignment arms 52a–52b. In this way, the elbows 50a–50b are spaced apart the desired distance 26 and configured such that the centerlines 92a–92b are substantially parallel. A valve such as a backflow preventer valve 10 is then attached either directly to the elbow joint or connected thereto by pipes 18a, 18b, 18a', 18b'. Backflow preventer valve 10 may be any of a number of types of backflow preventer valves, including the type described in U.S. patent appln. Ser. No. 07/650,799 incorporated herein by reference, now U.S. Pat. No. 5,107,888. In one embodiment, the arms are permanent, i.e., are left in place after the valve is installed.

In light of the above description, a number of advantages of the present invention can be seen. The present invention provides for installation of connecting fittings and pipes to permit installation of a valve which requires a predetermined spacing and alignment. The present invention permits the installer to achieve the desired spacing and alignment in a more precise and less labor-intensive way than the previous method of measurement. The present invention provides for transfer of force to load the elbows and the joints and bolts in a compressive manner rather than a sheer or tension manner. In other words, when flow from inlet pipe 12 reaches the bend 30a, using the present invention, the force derived from the fluid making the 90 degree bend is transferred to the arms 52a–52b such that the arms are in a compression loading condition (i.e. one pushed toward the other) rather than in a tension or sheer condition. In some circumstances, the provision of compression loading may eliminate the need for providing thrust blocks 28a–28b.

Although the present invention has been described by way of a preferred embodiment and certain variations and modifications, other variations and modifications can also be used. The present invention can be used in connection with installation of other types and sizes of valves than those depicted. Other attachment means than bolts between the arms can be used such as rivets, clamps, welding and the like. Other cross-sectional shapes of the alignment arm can be used such as circular, I-beam, H-beam, cruciform and like. Other complementary shapes can be used for connection between the arms and/or extensions, such as tongue and groove, angle splice, butt, lapped, dovetail or sleeve and collar. The invention can be used without requiring that the ends of the two alignment arms be identical or that the arms or arm/elbow combination be congruent left and right. The present invention can be used for establishing a substantially vertical alignment or angled alignment rather than a substantially horizontal alignment. The present invention can be used in connection with fittings or connectors other than elbows such as T connections, 45 degree connections, other angled connections and the like. It is possible to use some aspects of the invention without using other aspects (e.g., arms, extensions and feet).

Although the present invention has been described by way of a preferred embodiment and certain variations and modifications, other variations and modifications can also be used, the invention being defined by the following claims.

What is claimed is:

1. Apparatus for aligning pipe connections to accommodate installation of a high pressure liquid valve, wherein said apparatus is subjected to various pressures, the apparatus comprising:
   first and second pipe connectors each having at least one inlet opening and one outlet opening;
   a first alignment arm connected to said first pipe connector, said first alignment arm having a first surface and at least a first hole;
   a second alignment arm, separate from said first alignment arm, connected to said second pipe connector and having a second surface and at least a first hole, wherein said first surface and hole of said first alignment arm firmly mates with said second surface and said hole of said second alignment arm; and
   means for coupling said first alignment arm to said second alignment arm to place said first and second pipe connectors in a predetermined alignment and a predetermined space apart to accommodate various installations, wherein said means for coupling maintain said predetermined alignment and spacing under said various pressures exerted by said valve on said alignment arms.

2. Apparatus, as claimed in claim 1, wherein said alignment arms are permanently connected to said first and second connectors.

3. Apparatus, as claimed in claim 1, wherein said first and second alignment arms include means for connecting one to the other.

4. Apparatus, as claimed in claim 3, wherein said means for connecting includes at least a first hole for accommodating a bolt.

5. Apparatus, as claimed in claim 3, wherein said means for connecting includes at least a first boss for accommodating a bolt of a predetermined length.

6. Apparatus, as claimed in claim 1, wherein each of said first and second alignment arms includes a flange portion having an end and a shoulder portion, wherein said shoulders prevent said first and second alignment arms from moving relative to each other.

7. Apparatus, as claimed in claim 6, wherein said first and second alignment arms are attached to each other such that said end of said flange of said first alignment arm is adjacent said shoulder of said second alignment arm and said end of said flange of said second alignment arm is adjacent said shoulder of said first alignment arm.

8. Apparatus, as claimed in claim 1, further comprising at least a first foot attached to each of said first and second connectors.

9. Apparatus, as claimed in claim 1, wherein said first and second alignment arms are configured to remain in place, coupling said first and second connectors following installation of said valve.

10. Apparatus, as claimed in claim 1, further comprising an extension arm coupling said first alignment arm to said second alignment arm.

11. Apparatus, as claimed in claim 10, wherein a first end of said extension arm is substantially congruent to a first end of said first alignment arm and a second end of said extension arm is substantially congruent to a first end of said second alignment arm.

12. Apparatus, as claimed in claim 1, wherein said means for coupling includes at least one hole for accomodating a connector to attach said first alignment arm to said second alignment arm.

13. Apparatus, as claimed in claim 12, wherein at least one of said first and second pipe connectors includes a flange having at least one hole formed therethrough and wherein said hole formed through said flange is substantially parallel with said hole formed in said coupling means.

14. A method for connecting a high pressure liquid valve to inlet and outlet lines comprising:

connecting a first elbow joint to said inlet pipe, said first elbow joint having a first alignment arm extending outward therefrom and having an outlet;

connecting a second elbow joint to said outlet pipe, said second elbow joint having a second alignment arm, separate from said first alignment arm, extending outward from said second elbow joint, said second elbow joint having an outlet;

connecting said first alignment arm to said second alignment arm so as to position said outlet of the first elbow joint with respect to said outlet of said second elbow joint such that the center line of said first outlet and the center line of said second outlet are substantially parallel and spaced apart a predetermined distance to accommodate various installations, said first and second alignment arms etch further including a shoulder portion, wherein wait shoulder portions mate firmly and prevent said alignment arm, from moving relative to each other when said apparatus is subjected to high pressure forces, said forces acting on said alignment arts;

connecting a first pipe to said outlet of said first elbow and a second pipe to said outlet of said outlet of said second elbow; and connecting said valve to said first and second pipes.

15. A method, as claimed in claim 14, further comprising permanently maintaining said alignment arms in position following installation of said valves.

16. A method, as claimed in claim 14, wherein said elbows are connected in the absence of attaching said elbows to a pressure block.

17. Apparatus, as claimed in claim 1, wherein said couplers are 90 degree elbow joints each having an inlet opening, an outlet opening and an external bend portion substantially mid-way there between.

18. Apparatus, as claimed in claim 17, wherein said first and second alignment arms are attached to said elbow joints substantially at said external bend portions.

19. A method, as claimed in claim 14, wherein said first and second elbow joints are substantially similar and interchangeable.

20. A method, as claimed in claim 1, wherein said first and second alignment arms are substantially similar and include means for accommodating an extension arm.

21. Apparatus for aligning pipe connections to accommodate installation of a high pressure liquid valve, wherein said apparatus is subjected to various high pressure forces, said apparatus comprising:

a first pipe connector assembly having
at least one inlet opening,
at least one outlet opening, and
an alignment arm;

a second pipe connector assembly having
at least one inlet opening,
at least one outlet opening, and
an alignment arm;

said first alignment arm and said second alignment arm having a connector wherein said first and second arms may be coupled to position said outlet openings, of said first and second pipe connector assemblies in a predetermined alignment and spaced a predetermined distance apart to accommodate various installation needs, said first and second alignment arms each further comprising a shoulder, wherein said shoulders may firmly and prevent said first and second alignment arms from moving relative to each, other under said various high pressure forces, said forces acting on said alignment arms;

said connector having at least one hole for accommodating a bolt to couple said first alignment arm with respect to said second alignment arm.

22. The apparatus of claim 21 wherein said extension arm is available in a plurality of lengths.

23. The apparatus of claim 19 wherein said first and second pipe connector assemblies are substantially identical and interchangeable.

24. The apparatus of claim 19 wherein said connecter further comprises an extension arm positioned between said first and second alignment arms.

* * * * *

(12) EX PARTE REEXAMINATION CERTIFICATE (5287th)
United States Patent
Bruce

(10) Number: US 5,392,803 C1
(45) Certificate Issued: Mar. 7, 2006

(54) APPARATUS AND METHOD FOR INSTALLING VALVES

(75) Inventor: Douglas A. Bruce, Fresno, CA (US)

(73) Assignee: CMB Industries, Inc., Fresno, CA (US)

Reexamination Request:
No. 90/005,903, Jan. 3, 2001

Reexamination Certificate for:
| | |
|---|---|
| Patent No.: | 5,392,803 |
| Issued: | Feb. 28, 1995 |
| Appl. No.: | 07/978,575 |
| Filed: | Nov. 19, 1992 |

(51) Int. Cl.
*F16K 43/00* (2006.01)

(52) U.S. Cl. .................. 137/15.09; 137/15.17; 285/179; 285/30

(58) Field of Classification Search ............ 137/15.09, 137/315.01, 15.17, 356; 285/30, 179, 23; 33/529; 403/335, 336, 337, 338
See application file for complete search history.

(56) References Cited

U.S. PATENT DOCUMENTS

| | | | | |
|---|---|---|---|---|
| 866,952 A | | 9/1907 | McKee ..................... | 285/30 |
| 909,179 A | | 1/1909 | Gray et al. | |
| 1,142,667 A | | 6/1915 | Calhoun .................. | 285/30 |
| 1,267,651 A | | 5/1918 | Ford ....................... | 285/30 |
| 1,290,665 A | * | 1/1919 | Russell ................... | 285/30 |
| 1,298,596 A | * | 3/1919 | Stevens .................. | 285/30 |
| 1,346,440 A | | 7/1920 | Bradfield ................ | 285/30 |
| 1,835,924 A | * | 12/1931 | Bartholomay ............ | 285/30 |
| 1,938,896 A | | 12/1933 | Ford | |
| 2,438,497 A | | 3/1948 | Ford ....................... | 285/30 |
| 2,576,630 A | * | 11/1951 | Mueller et al. .......... | 285/30 |
| 2,650,837 A | | 9/1953 | Smith et al. | |
| 2,795,437 A | | 6/1957 | Mueller .................. | 285/30 |
| 2,892,641 A | * | 6/1959 | Ford ....................... | 285/179 |
| 3,478,994 A | * | 11/1969 | Ryall ...................... | 403/336 |
| 3,511,524 A | * | 5/1970 | Ford et al. ............... | 285/30 |
| 3,730,213 A | | 5/1973 | Bates ...................... | 285/30 |
| 3,961,528 A | | 6/1976 | Ford ....................... | 137/364 |
| 5,145,214 A | * | 9/1992 | Hunt ...................... | 285/30 |

OTHER PUBLICATIONS

American Water Works Association, American National Standard for Ductile–Iron Fittings, 3 In. Through 48 In., For Water and Other Liquids.
The Ford Meter Box Company, Inc., Ford Coppersetters, Linesetters, and Resetters, Nov. 1984.
Ames Co. Engineered Products, Specification Sheet Back-flow Piping Products Risers, Manifolds, Custom Retrofits 2½–10" FLG, MJ, PE, Bell, 1987.
Nappco, 3"–24" Full–Flow Ductile Iron Mechanical Joint Fittings, pp. 2 and 10.
Riken, Couplings and Fittings, Assembly Procedure for Couplings, pp. 5 and 7.
Valley Pipe & Supply, Inc., Cast Iron Flanged, p. pf–47.
Mueller 2⅛" Post and Flush Type Fire Hydrants.
Water and Water Supplies for Fire Protection, pp. 16–38 and 16–39.
Mueller, Cast Iron Meter Yokes and Cast Iron Meter Boxes.

* cited by examiner

*Primary Examiner*—John Fox

(57) ABSTRACT

Alignment and spacing apparatus for use in installing valves such as backflow preventer valves is provided. First and second couplers such as 90 degree elbow joints are each provided with alignment arms extending therefrom. The alignment arms have portions which permit the arms to be coupled to one another. The alignment arms provide for configuring the elbows in a predetermined relationship with one another, such as for providing for seating the alignment arms with respect to each other in a predetermined relationship. In one embodiment, each alignment arm has a flange portion which is seated against a shoulder portion of the other alignment arm in such a way that the elbow joints are connected such that the center line of the inlet and outlet of the elbow joints are substantially parallel and spaced apart a predetermined distance.

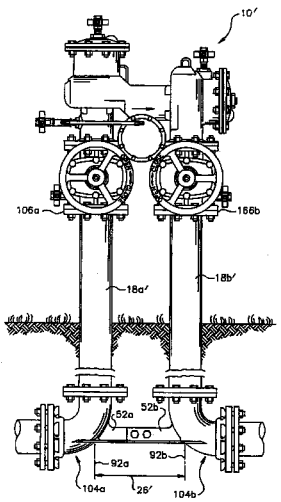

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5, 8, 10, 11, 13, 22 and 24 is confirmed.

Claims 1, 3, 12, 14 and 19–21 are cancelled.

Claims 2, 4, 6, 9, 15–17 and 23 are determined to be patentable as amended.

Claims 7 and 18, dependent on an amended claim, are determined to be patentable.

2. Apparatus, as claimed in claim [1] *5*, wherein said alignment arms are permanently connected to said first and second connectors.

4. Apparatus, as claimed in claim [3] *5*, wherein said means for connecting includes at least a first hole for accommodating a bolt.

6. Apparatus, as claimed in claim [1] *5*, wherein each of said first and second alignment arms includes a flange portion having an end and a shoulder portion, wherein said shoulders prevent said first and second alignment arms from moving relative to each other.

9. Apparatus, as claimed in claim [1] *5*, wherein said first and second alignment arms are configured to remain in place, coupling said first and second connectors following installation of said valve.

15. A method, as claimed in claim [14] *24*, further comprising permanently maintaining said alignment arms in position following installation of said valves.

16. A method, as claimed in claim [14] *24*, wherein said elbows are connected in the absence of attaching said elbows to a pressure block.

17. Apparatus, as claimed in claim [1] *5*, wherein said couplers are 90 degree elbow joints each having an inlet opening, an outlet opening and an external bend portion substantially mid-way there between.

23. [The apparatus of] *Apparatus, as claimed in* claim [19] *24,* wherein said first and second pipe connector assemblies are substantially identical and interchangeable.

\* \* \* \* \*